US008599961B2

(12) United States Patent
Schmidt et al.

(10) Patent No.: US 8,599,961 B2
(45) Date of Patent: Dec. 3, 2013

(54) CREST FACTOR REDUCTION METHOD AND CIRCUIT FOR A MULTI-CARRIER SIGNAL

(75) Inventors: Georg Schmidt, Laichingen (DE); Johannes Schlee, Ulm (DE)

(73) Assignee: KATREIN-Werke KG, Rosenheim (DE)

( * ) Notice: Subject to any disclaimer, the term of this patent is extended or adjusted under 35 U.S.C. 154(b) by 429 days.

(21) Appl. No.: 12/904,538

(22) Filed: Oct. 14, 2010

(65) Prior Publication Data

US 2012/0093209 A1 Apr. 19, 2012

(51) Int. Cl.
*H04K 1/02* (2006.01)

(52) U.S. Cl.
USPC .......................................................... 375/296

(58) Field of Classification Search
USPC ......... 375/295, 296, 219, 316, 285, 260, 259; 455/91, 114.2, 114.3; 332/106, 107, 332/149, 159, 117, 123; 330/149
See application file for complete search history.

(56) References Cited

U.S. PATENT DOCUMENTS

| | | | | |
|---|---|---|---|---|
| 5,710,990 A * | 1/1998 | Long et al. | ..................... | 455/103 |
| 7,313,373 B1 | 12/2007 | Laskharian et al. | | |
| 8,259,846 B2 * | 9/2012 | Liang et al. | ..................... | 375/296 |
| 8,265,196 B2 | 9/2012 | Gandhi | | |
| 2002/0101936 A1 * | 8/2002 | Wright et al. | ................. | 375/296 |
| 2004/0052314 A1 | 3/2004 | Copeland | | |
| 2006/0029158 A1 * | 2/2006 | Lipka et al. | ................... | 375/300 |

FOREIGN PATENT DOCUMENTS

WO 2004/019540 3/2004

OTHER PUBLICATIONS

Kim et al, "Doherty Feed-Forward Amplifier Performance Using a Novel Crest Factor Reduction Technique" IEEE Microwave & Wireless Components Letters, vol. 17 No. 1, Jan. 2007, 3 pages.
Kim et al, "An Efficient Crest Factor Reduction Technique for Wideband Applications", Analog Integr. Cir. Sig. Process (2007) 51, 8 pages.
Hemphill et al., "Peak Cancellation Crest Factor Reduction Reference Design", XILINX Application Note (XAPP 1033), Dec. 5, 2007, 32 pages.
Kim et al, "Digital Predistortion Linearization and Crest Factor Reduction for Wideband Applications" Thesis document, Dec. 8, 2006, 64 pages (Part 1).
Kim et al, "Digital Predistortion Linearization and Crest Factor Reduction for Wideband Applications" Thesis document, Dec. 8, 2006, 64 pages (Part 2).

* cited by examiner

*Primary Examiner* — Sam K Ahn
*Assistant Examiner* — Vineeta Panwalkar
(74) *Attorney, Agent, or Firm* — Stephen H. Eland; Dann, Dorfman, Herrell & Skillman

(57) ABSTRACT

A method for crest factor reduction of a multi-carrier signal is disclosed. The method comprises determining a plurality of signal values of a plurality of single-carrier signals prior to combining the plurality of single-carrier signals to form the multi-carrier signal. The method further comprises performing a joint potential peak detection on the plurality of signal values, producing a temporal position of a possible peak in the multi-carrier signal, generating a plurality of cancellation pulses, and injecting the plurality of cancellation pulses to the plurality of single-carrier signals at temporal injection positions which correspond to the temporal position of the possible peak in the multi-carrier signal. The single-carrier signals are then combined to form a crest factor reduced multi-carrier signal. A corresponding circuit and corresponding computer program product useable during manufacture and operation are also disclosed.

12 Claims, 8 Drawing Sheets

CREST FACTOR REDUCTION METHOD AND CIRCUIT FOR A MULTI-CARRIER SIGNAL

CROSS REFERENCE TO RELATED APPLICATIONS

This application is related to U.S. patent application Ser. No. 12/904,606 entitled: CREST FACTOR REDUCTION FOR A MULTICARRIER-SIGNAL WITH SPECTRALLY-SHAPED SINGLE-CARRIER CANCELATION PULSES, filed on Oct. 14, 2010. The entire contents of the forgoing application are incorporated herein by reference.

FIELD OF THE INVENTION

The field of the invention relates to a method for crest factor reduction of a multi-carrier signal. The field of the invention also relates to a crest factor reduction circuit for a multi-carrier signal. The field of the invention further relates to a computer program product enabling a foundry to carry out the manufacture of a chip comprising the crest factor reduction circuit, and to a computer program product enabling a processor to execute the method for crest factor reduction of a multi-carrier signal.

BACKGROUND OF THE INVENTION

When transmitting radio signals, a transmitter for the radio signal usually comprises a power amplifier. The power amplifier can be operated in a number of different modes of operation, such as a class A amplifier, a class B amplifier, a class AB amplifier, a class C amplifier, and a class D amplifier. The choice of one of these classes as the mode of operation for the power amplifier is usually a compromise between signal distortion and power efficiency. For example, a class A amplifier offers a very low degree of signal distortion, but has poor power efficiency. A class D amplifier, on the other hand, exhibits a very good power efficiency but distorts the input signal to a sequence of digital pulses having the same amplitude.

In the domain of wireless mobile communications, such as used in cellular communication networks, another factor comes into play: the spectrum useable for wireless communications is a limited resource which needs to be exploited efficiently with the increasing demand for wireless communication and applications. This need for efficient spectrum utilization was one of the driving forces for the development of new standards for wireless communication, such as the family of standards for mobile communications commonly termed "third generation", or 3G. The 3G family includes UMTS (Universal Mobile Communication System), CDMA 2000 (Code Division Multiple Access), DECT (Digital Enhanced Cordless Telecommunications), and WiMAX (World wide Interoperability for Micro wave Access) standards, among others. These third generation standards, while offering a more efficient utilization of spectrum resources than earlier the older wireless communications standards, make heavy demands on the linearity of the equipment used to process the signal, i.e. transmitters and receivers. For the transmitter this typically means that the power amplifier needs to operate in the linear region.

The linear region of the power amplifier has to be large enough to receive the dynamic range of the telecommunications signal to be amplified. A power amplifier with a large linear range of operation typically is more expensive and consumes more power than a power amplifier with a smaller linear range of operation. The required size of the linear range is, among others, determined by a property of an input signal called "crest factor". The crest factor is the ratio between a maximum peak and an average value of a signal. Faced with a signal with a high crest factor the power amplifier needs to be designed for the maximum peak value, even though the maximum peak value only occurs very scarcely.

The crest factor reduction of digital radio signals is desirable in third generation cellular network base station radio front end equipment in order to achieve high power amplifier efficiency. Generally, the higher the crest factor, the more back-off is necessary when designing an analog power amplifier. A high back-off results in a reduced efficiency for most state-of-the art power amplifier designs.

For a standard transmitter, such as in a remote radio head (RRH), the crest factor reduction may be applied directly to the multi-carrier signal prior to feeding the multi-carrier signal into the power amplifier.

Several state-of-the art approaches and reference designs exist for reducing the crest factor of the multi-carrier signals. An international patent application published under the international publication number WO 2004/019540 A2 discloses a crest factor reduction processor for wireless communications. A plurality of peak detection and cancellation circuits is arranged in a sequence in the WO'540 application. This serves to reduce peaks that, as a result of "peak regrowth", are caused at sample points near to a reduced peak point.

U.S. Pat. No. 7,313,373 B1 discloses a crest factor reduction for use in a multi-band transmitter capable of transmitting a plurality of component signals that are associated with dedicated sub-bands. The component signals are superposed and the superposed signal is processed to form a clipping noise error signal. The clipping noise error signal is applied to the component signals using a least square estimation to project clipping noise error onto the sub-bands.

A number of scientific papers by Wan-Jong Kim also address crest factor reduction techniques. These articles are:
IEEE Microwave and wireless components letters, vol. 17, no. 1, January 2007: "Doherty feed-forward amplifier performance using a novel crest factor reduction technique"
Analog Integrated Circuits and Signal Processing (2007) 150: 19-26: "An efficient crest factor reduction technique for wide band applications"
Thesis (Ph.D)—School of Engineering Science, Simon Fraser University, fall 2006: "Digital pre-distortion linearization and crest factor reduction for wide band applications".

An application note by Xilinx, Inc. entitled "Peak cancellation crest factor reduction reference design", identification no. XAPP 1033 (v 1.0 Dec. 5, 2007), describes a peak cancellation method based on a generation of a cancellation pulses. The peak cancellation is achieved by subtracting spectrally shaped pulses from the signal peaks that exceed a specified threshold. The cancellation pulses are designed to have a spectrum that matches that of the high-crest factor input signal and therefore introduce only negligible out-of-band interference. For multi-carrier configurations, the Xilinx application note proposes the creation of a composite multi-band filter. Each of the cancellation pulses is filtered by the composite multi-band filter and accordingly occupies portions of the spectrum that correspond to the transmission band(s) of the multi-band filter. In active antennas with a distributed transceiver architecture, the CFR arrangement proposed by Xilinx would have to be implemented in each transmitter path because that is where the combining of the single-carrier signals to the multi-band signal occurs.

SUMMARY OF THE INVENTION

It would be desirable to further develop crest factor reduction techniques for a multi-carrier signal. It would also be desirable for the crest factor reduction technique to be substantially invariant to the phases of the single carrier signal and/or to phase shifts applied to the single-carrier signals downstream of the crest factor reduction. These desires and/or possible other desires are addressed by a method for crest factor reduction of a multi-carrier signal which comprises a plurality of single-carrier signals. The method comprises analysing the plurality of single carrier signals prior to combining the plurality of single carrier signals to form the multi-carrier signal, performing a joint potential peak detection, generating a plurality of cancellation pulses, injecting the plurality of cancellation pulses to the plurality of single-carrier signals, and combining the single-carrier signals to form a crest factor reduced multi-carrier signal.

The joint potential peak detection is performed on the plurality of signal values and the joint potential peak detection produces a temporal position of a possible peak in the multi-carrier signal. The joint potential peak detection may be regarded as an anticipation of the subsequent combining process of the single-carrier signals. The joint potential peak detection may for example take into account a-priori knowledge about the combining process, such as a typical range of modifications that the single-carrier signals may undergo prior to or within the combining process.

The generation of the plurality of cancellation pulses is typically done in response to a finding of the joint potential peak detection, indicating that, on the basis of the single-carrier signal, a possible peak in the (yet to be formed) multi-carrier signal has been detected. The plurality of cancellation pulses is then injected to the plurality of single-carrier signals at the plurality of temporal injection positions. The plurality of temporal injection positions corresponds to the temporal position of the possible peak in the multi-carrier signal. The plurality of single-carrier signals may be individually adjusted with respect to phase and amplitude, i.e. a first one of the plurality of single-carrier signals may be modified with respect to phase and/or amplitude differently than a second one of the plurality of single-carrier signals in the course of signal processing subsequent to the crest factor reduction. This individual processing of the single-carrier signals may lead to temporal shifts from the first single-carrier signal with respect to the second single-carrier signal. It could be that the temporal injection position within the first single-carrier signal and corresponding to the temporal position of the possible peak in the multi-carrier signal is different from the temporal injection position within the second single-carrier signal and also corresponding to the temporal position of the possible peak in the multi-carrier signal.

The crest factor reduction method described in this disclosure may be useful in connection with active antennas with a distributed transceiver architecture. Unlike a remote radio head (RRH) which typically comprises a single power amplifier only, active antennas with distributed transceiver architecture have the potential of providing advanced features such as but not limited to carrier-wise beamforming. This requires a transmission path-specific manipulation of the phases of the different carriers for the transmission path-specific multi-carrier signal. Many state-of-the-art crest factor reduction methods have the draw back that the state of the art methods have to be applied directly to the multi-carrier signal. Performing a single-carrier-specific crest factor reduction followed by applying transmission path-specific beamforming and multi-carrier processing would typically increase the crest factor again. Consequently, such state-of-the-art techniques have to be applied individually for each transceiver module after beam forming and multi-carrier combining. For an active antenna with N transmission paths, this means that N crest factor reduction instances are required, which can be an expensive solution, depending on the number of transmission paths N. The crest factor reduction method of this disclosure manipulates the several single-carrier signals prior to multi-carrier combining in such a way that a desired crest factor of the multi-carrier signal lies in a pre-defined range. A goal of the crest-factor reduction method according to the teachings of this disclosure is to perform the manipulation of the carrier signals in such a way that the desired crest factor is achieved regardless of the phases of the single-carrier signals. This allows for manipulation of the phases of the single-carrier signals individually for each transmission path prior to multi-carrier combining which in turn allows for reducing the number of required crest factor reduction instances.

For an active antenna with sixteen individual transmission paths it is estimated that the FPGA/ASIC resource cost and power consumption is approximately four times smaller for a crest factor reduction method according to the teachings disclosed herein, than for an implementation comprising individual crest factor reduction units in each one of the 16 transmission paths.

In one aspect of the invention, the joint potential peak detection may comprise: determining a sum of absolute values of the plurality of single-carrier signals at a comparison temporal position ("absolute values sum"), comparing the absolute values sum to a peak indicator threshold, and adopting the comparison temporal position as the temporal position of the possible peak in the multi-carrier signal if the absolute values sum is greater than the peak indicator threshold.

The absolute values sum over the single-carrier signals at the comparison temporal position is an indicator for a probability that the single-carrier signals add up to a signal peak once combined to form the multi-carrier signal. The absolute values of the single-carrier signals, after comparison of the temporal positions, enter into the formation of the absolute values sum so that the phases of the single-carrier signals do not influence the absolute values sum. Hence, the absolute values sum may be regarded as a measure for the worst case in which the single-carrier signals would have substantially the same phase during the step of combining the single-carrier signals to form the crest factor reduced multi-carrier signal.

The peak indicator threshold can be chosen so that all potential peaks may be effectively canceled and only a small number of "fake" peaks are subjected to the injection of cancellation pulses. These "fake" peaks are detected by the joint peak detection and are in fact false alarms. To determine a good value for the peak indicator threshold, a statistical analysis of the distribution of the phase relations between the single-carrier signals may be carried out.

In a further aspect of the disclosure, the joint potential peak detection may further comprise: finding an interval in which the absolute values sum is greater than the peak indicator threshold, determining values of the multi-carrier signal within the interval, determining a maximum of the values of the multi-carrier signal and a maximum position of the maximum, and adopting the maximum position as the temporal position of the possible peak in the multi-carrier signal. The detection of the interval in which the absolute values sum is greater than the peak indicator threshold, can be regarded as a good first guess for the temporal position of the potential peak. Once the interval fulfilling the above-mentioned condition has been found, a more exact determination of the temporal position of the potential peak can be carried out.

In one aspect of the disclosure, ones of the plurality of cancellation pulses have spectral properties that substantially match single-carrier spectral properties of corresponding ones of the plurality of single-carrier signals. The cancellation pulses that match the spectral properties of the single-carrier signals on a 1-to-1 basis are expected to have little or no influence on single-carrier signals having different spectral properties during the combining of the single-carrier signals and subsequent to the combining of the single-carrier signals. Any residues of the cancellation pulse after injection to the corresponding single-carrier signal will not or only negligible alter other single-carrier signal components of the multi-carrier signal.

In one aspect of the disclosure, the phases of ones of the plurality of cancellation pulses injected to corresponding ones of the plurality of single-carrier signals are substantially aligned to phases of the corresponding ones of the plurality of single-carrier signals so that ones of the plurality of cancellation pulses and corresponding ones of the plurality of the single-carrier signal contributions to the possible peak in the multi-carrier signal are subject to an at least partially destructive interference. The alignment between a particular cancellation pulse and its corresponding single-carrier signal is at the temporal position of the possible peak in the multi-carrier signal. As mentioned above, temporal shifts and/or phase shifts may occur between the point of injection of the cancellation pulse and the combining point. This temporal/phase shift may be taken into account for exactly synchronizing the cancellation pulse with the single-carrier signal at the stretch of the single-carrier signal which will contribute to the peak in the multi-carrier signal. Regarding the single-carrier signal contributions to the possible peak in the multi-carrier signal, note that the single-carrier signals are later (during the combining action) combined to form the multi-carrier signal. Hence, each single-carrier signal makes a more or less important contribution to the possible peak. For the purpose of aligning the cancellation pulses with the corresponding single-carrier signals it may be helpful to have knowledge about the combining process and modifications (i.e. phase shifts, amplification, attenuation, etc.) to the single-carrier signals prior to the combining, in particular between the injection of the cancellation pulses and the combining.

In one aspect of the disclosure, the method for crest factor reduction may further comprise weighting the plurality of cancellation pulses with a pulse amplitude distribution vector prior to injecting the plurality of cancellation pulses to the plurality of single-carrier signals. The weighting of the plurality of cancellation pulses allows an individual adjustment of the cancellation pulses to be applied to the plurality of single-carrier signals based on, for example, a-priori knowledge or instantaneous values of the plurality of single-carrier signals.

In an aspect of the disclosure the method for crest factor reduction may further comprise additional actions between the action of injecting the plurality of cancellation pulses and the action of combining the single-carrier signals. These additional actions are: splitting each single-carrier signal of the plurality of single-carrier signals into a plurality of single-carrier transmission paths signals and individually adjusting at least one of the phase and an amplitude of the plurality of single-carrier transmission path signals. The action of combining the single-carrier signals comprises combining, on a per-transmission path basis, the plurality of single-carrier transmission path signals to form a crest factor reduced multi-carrier transmission path signal.

Splitting each single-carrier signal into a plurality of single-carrier transmission path signals and individually adjusting the phases and/or the amplitudes of the single-carrier transmission path signals allows for individually beamforming each one of the plurality of single-carrier signals, i.e. an individual beam direction and an individual beam shape is possible for each one of the carriers. The disclosed crest factor reduction method is capable of maintaining a pre-defined crest factor even though only one central crest factor reduction for all single-carrier signals and transmission paths is performed. Depending on the settings of various parameters used in the crest factor reduction method (e.g. the peak indicator threshold and the pulse amplitude distribution vector), the crest factor reduction may carry out too much peak reduction, but usually this is less serious than missing a potential peak in the multi-carrier signal. The crest factor reduction method is robust regarding phase shifts between the plurality of single-carrier signals, if not even phase invariant.

Each one of the plurality of single-carrier transmission path signals is combined with other ones of the single-carrier transmission path signals to form multi-carrier transmission path signals. The multi-carrier transmission path signal is relayed via a transmission path which typically comprises a power amplifier operated in its linear operating range. An output of the power amplifier typically feeds an antenna element which is part of an antenna array comprising a plurality of antenna elements. The beamforming of the plurality of single-carrier signals may be achieved by radiating different versions of a particular single-carrier signal from the plurality of antenna elements that are slightly phase-shifted with respect to each other.

The crest factor reduction method disclosed herein allows the implementation of different beamforming settings for different carriers at the same transceiver and multi-carrier combining without a risk of a significant crest factor re-growth due to signal manipulations like carrier-wise phase shifts.

The disclosure also teaches a crest factor reduction circuit for a multi-carrier signal formed by combining a plurality of single-carrier signals. The crest factor reduction circuit is placeable upstream of a combining point of the plurality of single-carrier signals and comprises a signal analyser, a joint peak detector, a plurality of cancellation pulse generators, and a plurality of cancellation pulse injectors. The signal analyser is intended and/or usable for analysing the plurality of the single-carrier signals and for producing a plurality of analysed single-carrier signals. The joint peak detector is usable and/or intended for analyzing the plurality of analysed single-carrier signals and for producing a temporal position of a possible peak in the multi-carrier signal. The plurality of cancellation pulse injectors is usable and/or intended for injecting the plurality of cancellation pulses to the plurality of single-carrier signals at a plurality of temporal injection positions. The plurality of temporal injection positions corresponds to the temporal position of the possible peak in the multi-carrier signal.

The crest factor reduction circuit is adapted to act on the plurality of single-carrier signals individually while taking into account the combination of the plurality of single-carrier signals to form the multi-carrier signal and possible influences of this combination process on the occurrence of signal peaks in the multi-carrier signal. The position within a multi-carrier transmitter at which the crest factor reduction circuit intervenes is one of the aspects of the functioning of the crest factor reduction circuit.

The signal evaluation unit and the joint peak detector may be regarded as an estimator of the multi-carrier signal. The plurality of signal values determined by the signal evaluation unit is forwarded to the joint peak detector. The joint peak detector may perform a comprehensive analysis of the plurality of single-carrier signals which may anticipate subsequent stages of signal processing affecting the plurality of single-carrier signals.

The crest factor reduction circuit functions by generating cancellation pulses which are injected into the plurality of single-carrier signals at appropriate temporal positions so that an effective cancellation of signal peaks may be expected. The generation of cancellation pulses is a sporadic event which occurs in an irregular manner. Thus, the principle of crest factor reduction by means of cancellation pulses is different to, for example, a continuous crest factor reduction by means of a continuous compensation signal or a suitable component such as a limiter.

A cancellation pulse-based crest factor reduction circuit uses a determination of the temporal position of a possible peak in the multi-carrier signal to know when the plurality of cancellation pulse generators should be activated. Note that the single-carrier signals may undergo a certain delay between the point where the signal evaluation unit determines the plurality of signal values and the combining point of the plurality of single-carrier signals. This means that the plurality of temporal injection positions may not be, in absolute terms, equal to the temporal position of the possible peak. The portions of the single-carrier signals at the plurality of temporal injection positions are combined to form the portion of the multi-carrier signal at the temporal position of the possible peak.

The crest factor reduction circuit disclosed herein may be an analog circuit, a digital circuit or a hybrid analog-and-digital circuit.

In one aspect of the teachings disclosed herein, the joint potential peak detector comprises an adder for adding the absolute values of the plurality of single-carrier signals at a comparison temporal position to form an absolute values sum and a comparator for comparing the absolute values sum with a peak indicator threshold. The plurality of cancellation pulse injectors is adapted to inject the plurality of cancellation pulses at the comparison temporal threshold if the comparator has detected that the absolute values sum is greater than the peak indicator threshold.

In a further aspect of the teachings disclosed herein, the joint potential peak detector may comprise an interval finder for finding an interval in which the absolute value sum is greater than the peak indicator threshold, a multi-carrier signal evaluator for determining values of the multi-carrier signal within the signal, and a maximum finder for determining a maximum of the values of the multi-carrier signal and the maximum position of the maximum, and for adopting the maximum position as the temporal position of the possible peak in the multi-carrier signal.

The plurality of cancellation pulse generators may be adapted to generate cancellation pulses having spectral properties that substantially match single-carrier spectral properties of corresponding ones of the plurality of single-carrier signals. To this end, the cancellation pulse generator may have templates of cancellation pulses with the desired spectral properties stored therein, or a filter is applied to give the plurality of cancellation pulses the desired spectral properties. Other options may exist for assuring that the spectral properties of the plurality of cancellation pulses matches the spectral properties of the corresponding ones of the plurality of single-carrier signals.

In an aspect of the teachings disclosed herein, the plurality of cancellation pulse injectors is adapted to substantially align phases of ones of the plurality of cancellation pulses to corresponding ones of the plurality of single-carrier signals so that ones of the plurality of cancellation pulses and corresponding ones of a plurality of single-carrier signal contributions to the possible peak in the multi-carrier signal are subject to an at least partial destructive interference. The at least partial destructive interference may be achieved, for example, by superposing two similar or identical signals with a phase shift of 180° between the two similar or identical signals. The cancellation pulse injectors may comprise phase shifters and/or delay elements. Furthermore, the phase shifters and/or delay elements may be variable and adjustable.

In another aspect of the disclosure, the crest factor reduction circuit may further comprise a cancellation pulse weighting unit for weighting the plurality of cancellation pulses with the pulse amplitude distribution vector upstream of the combining point. The pulse amplitude distribution vector allows an adjustment of the amount of crest factor reduction for different ones of the plurality of single-carrier signals. For example, it is possible that different carriers belong to different wireless communication standards. These different wireless communication standards may have different specifications regarding signal distortions (EVM) and out-of-band emission (ACR). If the crest factor reduction is applied too aggressively, then theses different specifications may be violated. This different amount of crest factor reduction can be applied to different ones of the single-carrier signals in order to ensure that these specifications are not violated. It should also be noted that signal crest factor reduction action introduces a certain degree of distortion to the single-carrier signals. The pulse amplitude distribution vector makes it possible to distribute the plurality of cancellation pulses among the single-carrier signals according to e.g. the capabilities of the individual single-carrier signals to cope with signal distortions induced by the injection of cancellation pulses.

In another aspect of the disclosure, the crest factor reduction circuit may further comprise a signal splitter connected to an output of the cancellation pulse injector of the plurality of cancellation pulse injectors and for splitting a single-carrier signal of the plurality of single-carrier signals into a plurality of single-carrier transmission path signals to be relayed by the plurality of transmission paths. The crest factor reduction circuit may also comprise a signal adjuster for individually adjusting at least one of a phase and an amplitude of the plurality of single-carrier transmission path signals. Each one of the plurality of transmission paths may comprise a combining point.

A crest factor reduction circuit as disclosed herein is useful for active antennas with distributed transceiver architecture that are intended for the transmission of multi-carrier signals.

The disclosure also teaches a mobile communications transmitter and a mobile communications base station comprising the crest factor reduction circuit.

The disclosure also teaches a computer program product, comprising a non-transitory computer-usable medium such as, but not limited to, solid-state memory or a removable storage medium, having control logics stored therein for causing a processor to execute a method for crest factor reduction of a multi-carrier signal comprising a plurality of single-carrier signals, the method comprising:

detecting time segments of the plurality of single-carrier signals prior to combining the plurality of single-carrier signals to form the multi-carrier signal, the sampling producing a plurality of sampled single-carrier signals;

performing a joint potential peak detection on the plurality of sampled single-carrier signals, the joint potential peak detection producing a temporal position of a possible peak in the multi-carrier signal;

generating a plurality of cancellation pulses, injecting the plurality of cancellation pulses to the plurality of single-carrier signals at a plurality of temporal injection positions, the plurality of temporal injecting positions corresponding to the temporal position of the possible peak in the multi-carrier signal;

combining the single-carrier signals to form a crest factor reduced multi-carrier signal.

In a further aspect of the disclosure, a computer program product is disclosed which comprises a non-transitory computer-usable medium, such as but not limited to solid-state memory or a removable storage medium, having control logic stored therein for causing a computer to manufacture a crest factor reduction circuit comprising:

an analyser for analysing the plurality of single-carrier signals and for producing a plurality of analysed single carrier signals;

a joint peak detector for analyzing the plurality of single-carrier signals and for producing a temporal position of a possible peak in the multi-carrier signal;

a plurality of cancellation pulse generators; and a plurality of cancellation pulse injectors for injecting the plurality of cancellation pulses to the plurality of single-carrier signals at a plurality of temporal injection positions, the plurality of temporal injection positions corresponding to the temporal positions of the possible peak in the multi-carrier signal.

DETAILED DESCRIPTION OF THE INVENTION

The invention will now be described on the basis of the drawings. It will be understood that the embodiments and aspects described herein are only examples and do not limit the protective scope of the claims in any way. The invention is defined by the claims and their equivalents. It will also be understood that features of one aspect can be combined with features of a different aspect.

Figure 1:
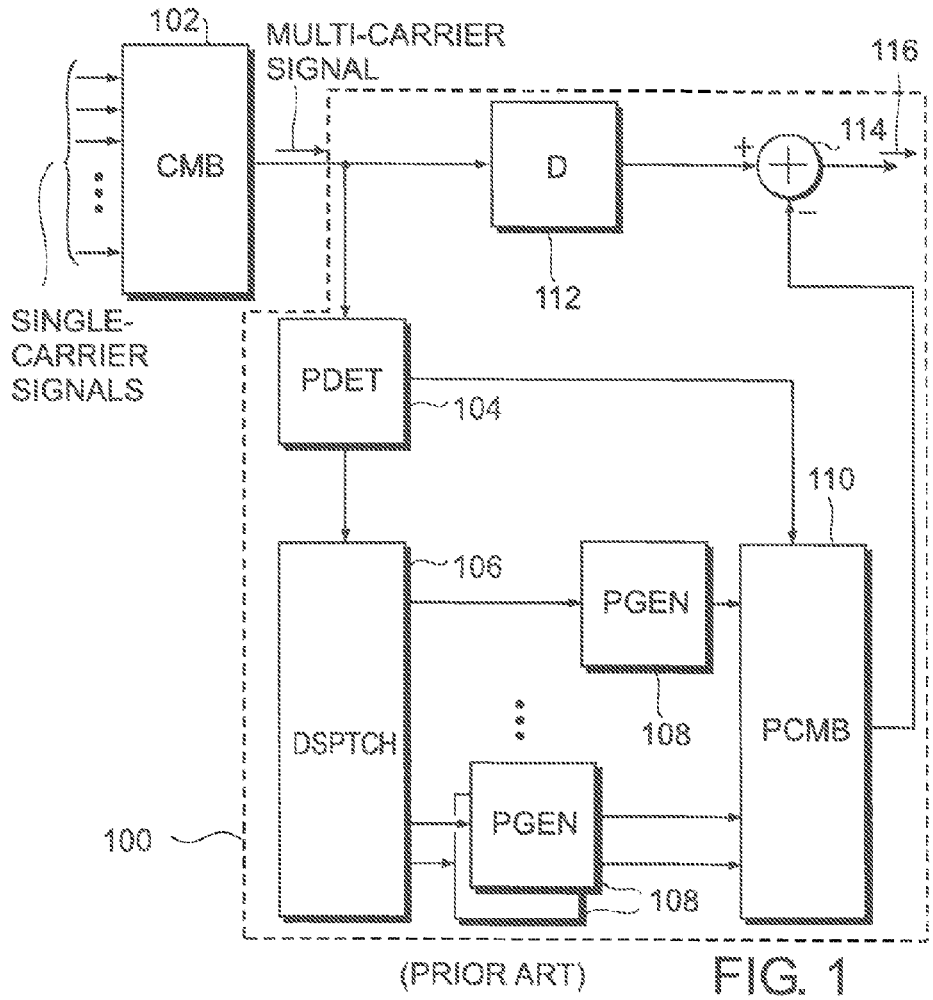
FIG. 1 shows a schematic block diagram of a crest factor reduction circuit of the prior art.

FIG. 1 shows a schematic block diagram of a crest factor reduction circuit according to the prior art. The crest factor reduction circuit acts on a multi-carrier signal which is generated by combining a plurality of single-carrier signals by means of a combiner 102. Within the crest factor reduction circuit 100, the multi-carrier signal is split and distributed to two paths. The multi-carrier signal per se is sent over a first path which leaves the multi-carrier signal substantially unmodified except for the introduction of a delay by means of a delay element 112 ("D"). The first signal path ends at a signal adder 114. A second signal path comprises a peak detector 104 ("PDET"), a dispatcher 106 ("DSPTCH"), a plurality of pulse generators 108 ("PGEN"), and a pulse combiner 110 ("PCMB").

This second signal path basically has the task of detecting peaks in the multi-carrier signal and of generating cancellation pulses on the basis of data provided by the detecting of peaks in the multi-carrier signal. The peaks in the multi-carrier signal are first detected by the pulse detector 104, which, for example, detects intervals in the multi-carrier signal exceeding a predefined threshold and determines the maximum signal amplitude within these intervals. When a pulse is detected, the pulse dispatcher 106 selects an unoccupied resource from the plurality of pulse generators 108. The plurality of pulse generators 108 may be regarded as a battery of pulse generators 108. The pulse dispatcher 106 uses the selected pulse generator 108 to generate a suitable pulse whose spectral envelope is typically chosen to largely coincide with a (potentially fragmented) spectral envelope of the multi-carrier signal. The plurality of pulse generators 108 is needed because it may be necessary to generate several cancellation pulses in a relatively quick succession. The pulse combiner 110 may also comprise a pulse scaler for adjusting the amplitude and phase of the pulse generator to achieve maximum peak cancellation at the point indicated by the pulse detector 104. The pulse detector 104 may provide additional information about the detected peak to the pulse scaler within the pulse combiner 110. A pulse combiner 110 then adds up the signals of all currently active pulse generators 108 and combines them into a single signal which is subtracted from the delayed multi-carrier signal at signal adder 114. The crest factor reduction circuit 100 outputs a crest factor reduced multi-carrier signal 116.

Figure 2:
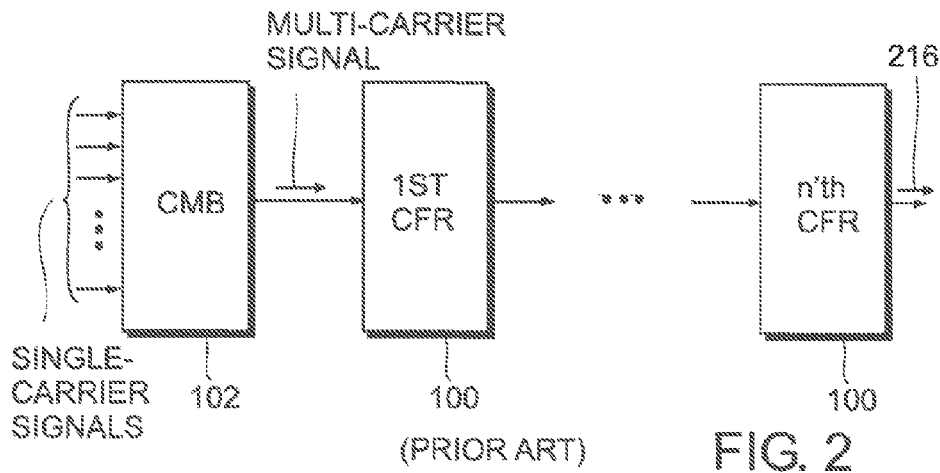
FIG. 2 shows a schematic block diagram of a multi-stage crest factor reduction of the prior art.

To achieve a desired crest factor, it may be necessary to apply the crest factor reduction block depicted in FIG. 1 iteratively several times. This is commonly implemented by cascading several crest factor reduction blocks as depicted in FIG. 2. FIG. 2 shows the combiner 102 which receives a plurality of single-carrier signals and combines them to form one single multi-carrier signal. The multi-carrier signal is forwarded to a first crest factor reduction unit 100, the details of which have been shown and described in FIG. 1. The crest factor reduced multi-carrier signal output by the first crest factor reduction unit 100 undergoes further crest factor reduction stages until a highly crest factor-reduced signal 216 is output by an n'th crest factor reduction circuit 100.

In the prior art, crest factor reduction is typically performed more or less immediately upstream of the power amplifier because any additional signal processing on the crest factor reduced multi-carrier signal could lead to a regrowth of the crest factor again. If beamforming is desired, most prior art solutions usually split the amplified multi-carrier signal into a plurality of antenna element signals and apply different phase shifts on the plurality of antenna element signals. Each one of the plurality of antenna element signals feeds an antenna element out of a plurality of antenna elements forming an antenna array. This sort of beamforming is relatively crude because a single-phase shift is used for the entire multi-carrier signal, regardless of the plurality of single-carrier signals that make up the multi-carrier signal. Besides the phase shift between the signals supplied to two adjacent antenna elements, the frequency of the signals has an influence on the beamforming process.

On the other hand, performing a single carrier-specific crest factor reduction followed by applying transceiver specific beamforming and multi-carrier processing would increase the crest factor again. Consequently, such techniques would have to be applied individually for each transceiver module after beamforming and multi-carrier combining. For an active antenna with M transceivers, this means that N crest factor reduction instances are required. State-of-the-art crest factor reduction methods have to be applied directly on the multi-carrier signal which leads to the necessity of providing a corresponding number of crest factor reduction circuits in the case of active antennas with distributed transceiver architecture.

Figure 3:
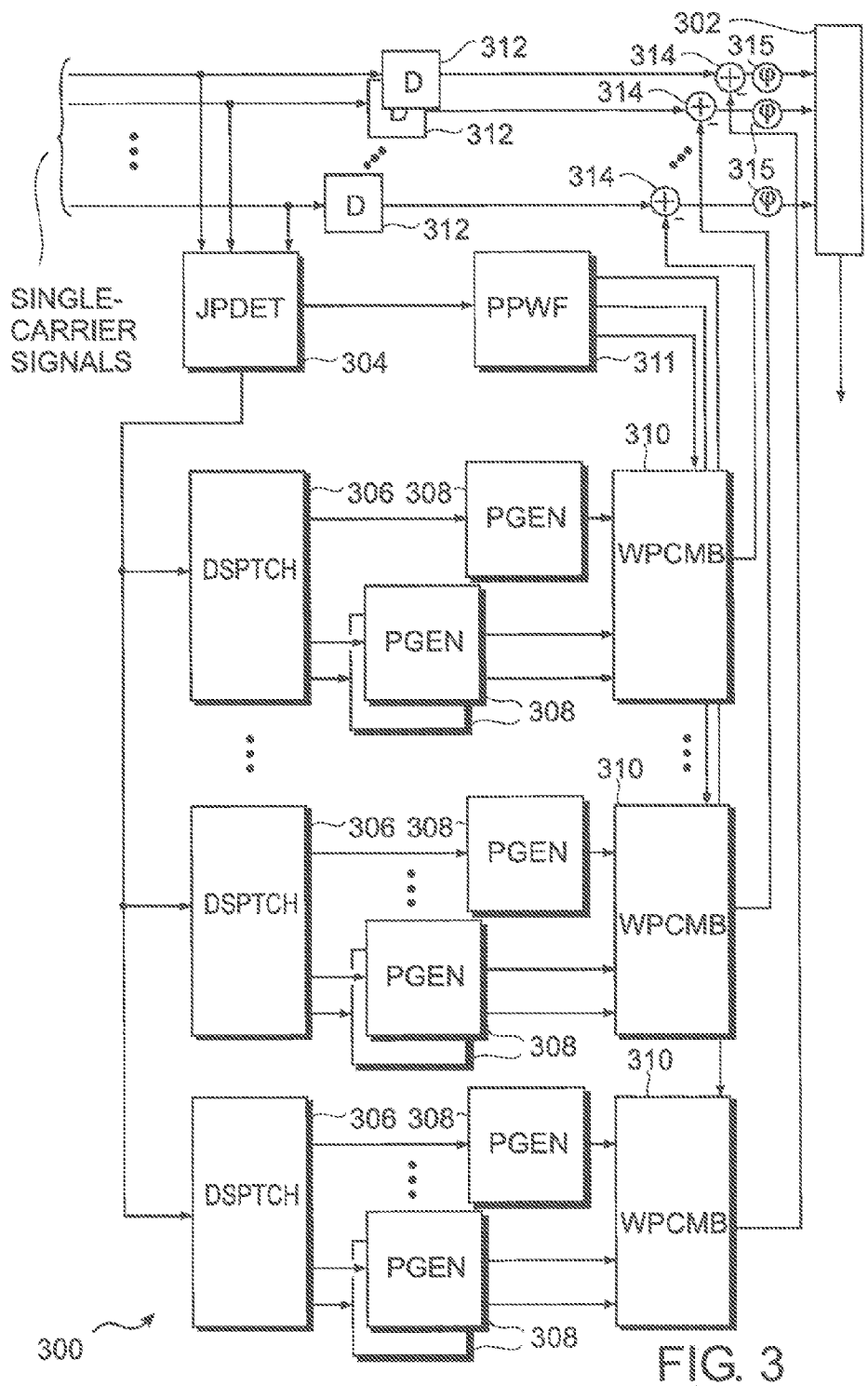
FIG. 3 shows a schematic block diagram of a crest factor reduction circuit according to an embodiment of the teachings disclosed herein.

FIG. 3 shows a schematic block diagram of a crest factor reduction circuit 300 according to the teachings of this disclosure. The crest factor reduction circuit 300 is placed upstream of a signal combiner 302, i.e. at a point where the plurality of single-carrier signals are not yet combined and are thus individually present.

A joint peak detector 304 ("JPDET") receives each one of the single-carrier signals of the plurality of the single-carrier signals in an individual manner. The joint peak detector 304 analyses the single-carrier signals to find out whether a potential peak is likely to occur once the single-carrier signals are combined to form the multi-carrier signal. The joint peak detector 304 may determine information about the potential peak in the multi-carrier signal, such as a temporal position of the possible peak (that is, the time of occurrence of the potential peak) and an amplitude of the potential peak. This information about the potential peak may then be sent by the joint peak detector 304 to a plurality of pulse dispatchers 306. Each one of the pulse dispatchers 306 belongs to single-carrier-specific subunit of the crest factor reduction circuit 300. A single-carrier-specific subunit comprises, in the exemplary illustration of FIG. 3, the pulse dispatcher 306 ("DSPTCH"), a plurality or "battery" of pulse generators 308 ("PGEN"), and a weighted pulse scaler and combiner 310 ("WPCMB"). A particular single-carrier-specific subunit is used for generating cancellation pulses to be applied to a corresponding one of the plurality of single-carrier signals. The crest factor reduction circuit 300, shown in FIG. 3, implements a 1-to-1 attribution of the single-carrier-specific subunits to the single-carrier signals. A 1-to-1 attribution is, however, not necessary, but only one of several options. The plurality of subunits produces a plurality of cancellation pulses for the plurality of single-carrier signals depending on predefined parameters, measurements on the single-carrier signals performed by the joint peak detector 304 and/or other data available to the crest factor reduction unit. The cancellation pulses output by the plurality of weighted pulse scaler and combiners 310 are sent to a plurality of signal adders 314 at which the cancellation pulses are subtracted from their corresponding single-carrier signal which has been delayed by a plurality of delay elements 312.

FIG. 3 shows a plurality of phase shifters 315 acting on the plurality of single-carrier signals. Note that the plurality of phase shifters 315 is normally not a part of the crest factor reduction unit 300. The plurality of phase shifters 315 is shown to illustrate that each single-carrier signal may be subject to a different phase shift prior to combining the single-carrier signals in the signal combiner 302. Even with the introduction of different phase shifts for each one of the plurality of single-carrier signals, the crest factor will not increase significantly in the multi-carrier signal output by the signal combiner 302. This phase invariance is one of the results achieved by the proposed crest factor reduction circuit 300 which can be summarized as "joint analysis/individual cancellation".

The crest factor principle depicted in FIG. 3 differs from state-of-the-art multi-carrier signal peak cancellation systems in that the single-carrier input signals are not combined prior to crest factor reduction. Rather than processing a single multi-carrier signal and reducing its crest factor, the system illustrated in FIG. 3 individually modifies ones of the single-carrier signals. The goal of this individual modification is not to obtain output signals with a specific crest factor, but a set of single-carrier output signals which yield a multi-carrier signal with a specified crest factor, when combined with an arbitrary phase and at arbitrary frequencies.

Joint Potential Peak Detector

Unlike the multi-carrier peak detector used in the crest factor reduction scheme depicted in FIG. 1, the joint potential peak detector 304 does not detect peaks in the signal, but signal positions in which a potential peak could occur when the individual single-carrier signals are combined into a multi-carrier signal with some phasing and at some frequencies. Such potential peaks can be detected for example by using Equations (1) and (2) as will be described later.

A more sophisticated implementation of the joint potential peak detector could take into account that, for some applications, the phase variance is limited and hence, instead of simply considering the sum of the absolute values, more refined metrics using a-priori knowledge about the phases during signal combining could be applied.

Phased Pulse Weight Former

Connected to the joint peak detector 304 is a phased pulse weight former 311 which receives information about detected potential peaks from the joint peak detector 304. The phased pulse weight former 311 obtains for example the phases of the individual single-carrier signals at the potential peaks, as well as the amplitude distance Theta defined by equation (4) given below from the joint potential peak detector 304. Together with the pulse amplitude distribution vector a it calculates complex weights for the weighted pulse scaler and combiner 310.

Pulse Dispatcher

The pulse dispatcher 306 selects an available pulse generator resource 308 from its pulse generator battery and triggers the selected pulse generator resource 308 to generate a cancellation pulse for the corresponding signal. If all pulse generator resources 308 are occupied, then a specific potential pulse cannot be canceled. If this happens, the effected potential pulse will presumably be canceled in one of the next iterations, provided that the parameters of the overall crest factor reduction system are chosen appropriately. The probability of no pulse generator resource 308 being available can be reduced by providing a sufficiently high number of pulse generator resources 308 for each single-carrier specific subunit.

Pulse Generator

When triggered a pulse generator 308 generates a suitable cancellation pulse, the spectral properties of which match the spectral properties of the corresponding signal. Technically, the pulse generator 308 may be realized as a programmable digital filter, which allows flexible reconfiguration and adaptation to different signals, e.g. different carrier signals for different mobile radio standards.

Weighted Pulse Scaler and Combiner

The weighted pulse scaler and combiner 310 adjusts the phase and the amplitude of a cancellation peak generated by the pulse generators in such a way that the desired reduction of the signal peak is achieved. The weighted pulse scaler and combiner 310 may be configured to observe constraints imposed by e.g. industrial standards for some of the plurality of single-carrier signals. For example, some of the single-carrier signals may operate under the GSM standards while others of the plurality of single-carrier signals operate under the UMTS standard. Assuming that the UMTS standard allows a larger margin for signal distortion, the single-carrier signals operating under the UMTS standard support a larger peak cancellation action than the single-carrier signals operating under the GSM standard. Therefore, the cancellation pulses injected to the UMTS signal(s) may be stronger than the cancellation pulses for the GSM signal(s). This bias towards cancellation pulses for the UMTS signal may be achieved by populating the pulse amplitude distribution vector corresponding values that take the industrial standard of the various ones of the single-carrier signals and their corresponding allowable distortion margins into account.

Figure 4:
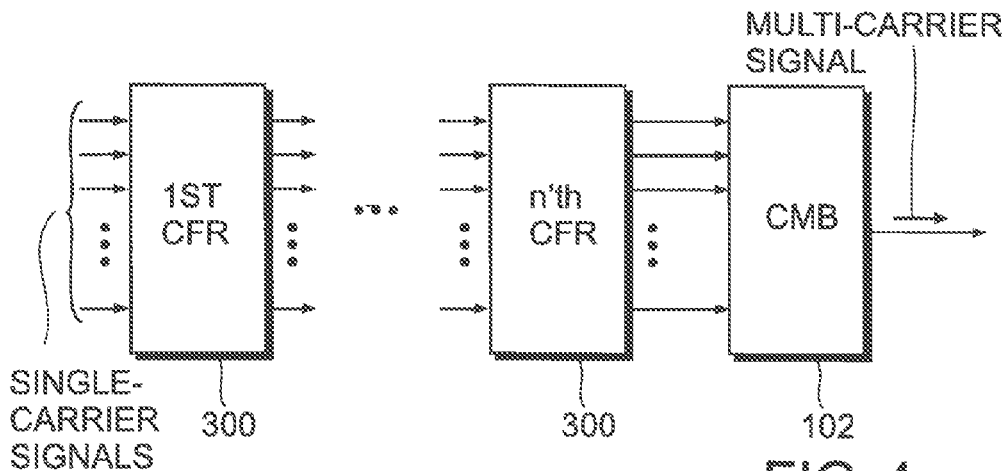
FIG. 4 shows a schematic block diagram of a multi-stage crest factor reduction according to the teachings disclosed herein.

FIG. 4 shows an iterative application of the crest factor reduction technique disclosed herein by cascading several of the crest factor reduction circuits 300 depicted in FIG. 2. When comparing the arrangement of FIG. 4 with the arrangement shown in FIG. 2, it can be seen that the order of multi-carrier combining and crest factor reduction is inversed. FIG. 4 shows that from the first crest factor reduction circuit 300 to the n'th crest factor reduction circuit 300 the plurality of single-carrier signals is passed on from one crest factor reduction circuit to a subsequent one. A possibility of inversing the order of multi-carrier combining and crest factor reduction offered by the teachings disclosed herein can be used in applications, in which the several single-carrier signals have to be combined with different phasing or at different frequencies, since crest factor reduction has only to be performed once in this case (possibly as cascaded multi-stage crest factor reduction as shown in FIG. 4).

Figure 5:
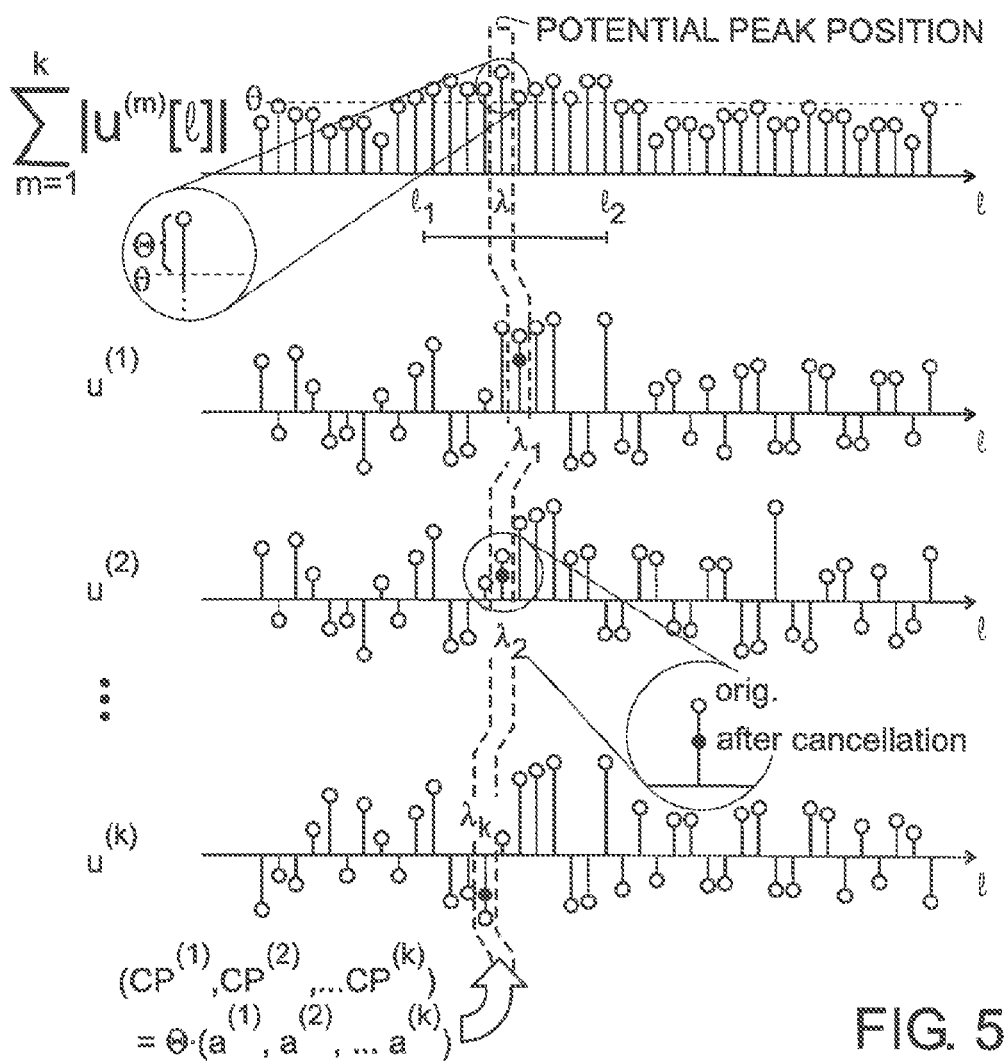
FIG. 5 shows exemplary signal wave forms occurring in a possible implementation of the teachings disclosed herein.

FIG. 5 shows exemplary signal wave forms useful for understanding the crest factor reduction method disclosed herein. The idea of the proposed crest factor reduction method is to perform crest factor reduction not on the multi-carrier signal but to manipulate the single-carrier signals in an appropriate way, such that the resulting crest factor after multi-carrier combining lies below a certain threshold, regardless of the phases of the multi-carrier signals. The signal interval at which the signal carrier signals have to be manipulated is found by the joint peak detector 304 (FIG. 3). The joint peak detector 304 finds signal intervals at which the sum of the absolute values exceeds a certain threshold. The exact temporal position at which the crest factor is ultimately reduced by applying a suitable cancellation pulse is then found as the maximum absolute value within this interval.

More precisely, joint potential peak detection can be described as follows. Assume that we have a set of k digitally sampled single-carrier signals $u^{(m)} = (u_1^{(m)}, u_2^{(m)}, \ldots)$, $m = 1, \ldots, k$ which are going to be combined into a multi-carrier signal $$v = \sum_{m=1}^{k} u^{(m)}$$

to detect potential peaks in the signal v, we first find an interval $<l_1, l_2>$ for which the following conditions are true:

$$\{v|_{l_1}^{l_2} = (v_{l_1}, \ldots, v_{l_2}) : |u_l^{(1)}| + \ldots + |u_l^{(m)}| > \eta \forall l_1 \le l < l_2,$$
$$\text{and } |u_l^{(1)}| + \ldots + |u_l^{(m)}| \le \theta \text{ for } l \in \{l_1-1, l_2-1\}\} \quad \text{Equation 1}$$

for a threshold value theta ($\theta$). A potential peak may be defined as a signal index, at which the multi-carrier signal $u^{(m)}$ has the potential to form a signal peak after combining the single-carrier signals, if a worst-case phase shift is applied to the single-carriers prior to combining. The threshold value theta ($\theta$) may depend on the average signal level of the resulting multi-carrier signal.

The upper signal wave form in FIG. 5 shows the sum of the absolute values ("absolute values sum") over a certain time interval, i.e. as a function of the signal index l. The threshold value theta is also shown in the upper diagram of FIG. 5. It can be seen that the absolute value sum exceeds the threshold value theta in an interval between two temporal positions referenced by signal indexes $l_1$ and $l_2$. The probability of a signal peak is expected to be elevated in the interval $[l_1, l_2]$. The absolute values sum is further investigated within the interval $[l_1, l_2]$ to determine a set of potential peak indices. The potential peak indices obey the condition $$\{\lambda\} = \left\{\arg\max_l \{v|_{l_1}^{l_2}\}\right\} \quad \text{Equation 2}$$

In FIG. 5, the absolute value sum has only one maximum inside the interval [l1, l2] at signal index lamda ($\lambda$). For each index in the set of potential peak indices a set of cancellation pulses for the individual single-carrier signals u(1), ... u(k) is created to reduce the signal amplitudes of the single-carrier signals at this point.

The lower part of FIG. 5 shows the signal wave forms of three single-carrier signals $u^{(1)}$, $u^{(2)}$, and $u^{(k)}$. Note that there could be further single-carrier signals $u^{(3)} \ldots u^{(k-1)}$, and that the signal wave forms are not necessarily to scale. At the potential peak position designated by lambda ($\lambda$) the single-carrier signals have added up to an absolute values sum that is greater than theta ($\theta$) and is also the maximum in the interval $l_1, l_2$. Note that due to subsequent different delays and/or phase shifts the temporal position lambda in the signal wave form of the three illustrated single-carrier signals $u^{(1)}$, $u^{(2)}$, and $u^{(k)}$ may not be exactly aligned to the temporal position lambda in the signal wave form of the absolute values sum. These individual delays and/or phase shifts can be adjusted if individual delays and/or phase shifts are known or can be estimated with sufficient accuracy. This is schematically illustrated by the staggered shape of the dashed frame indicating the potential peak position lambda. It is, however, not necessary for the functioning of the crest factor reduction method to have this knowledge because the crest factor reduction method will be almost as efficient if a certain degree of uncertainty remains as to the exact temporal relation among the plurality of single-carrier signals.

As mentioned above, a cancellation pulse is injected to each one of the plurality of the single-carrier signals at the plurality of temporal injection positions that correspond to the temporal position of the possible peak in the future multi-carrier signal. In FIG. 5, the cancellation pulses are shown as a vector $(CP^{(1)}, CP^{(2)}, \ldots CP^{(k)})$. The cancellation pulse $CP^{(1)}$ is injected to the single-carrier signal $u^{(1)}$ and leads to a (partial) cancellation of the signal value of the single-carrier signal at the temporal position lambda. The effect of the partial cancellation caused by the injection of the cancellation pulse $CP^{(1)}$ is illustrated by the black solid dot in FIG. 5. In an analog manner the single-carrier signals $u^{(2)}$ through $u^{(k)}$ are processed by injecting cancellation pulses $CP^{(2)}$ through $CP^{(k)}$ at the corresponding temporal injection positions $\lambda_2$ through $\lambda_k$.

The plurality of cancellation pulses may be adjusted as a function of an amplitude distance Theta $\Theta$ which is defined as $$\Theta = \theta - |u_\lambda^{(1)}| - \ldots - |u_\lambda^{(m)}|$$  Equation 4

The amplitude distance $\Theta$ is the difference between the threshold value theta ($\theta$) and the absolute values sum at the temporal position of the possible peak lambda ($\lambda$). This is schematically illustrated as an inset in FIG. 5. The plurality of cancellation pulses may be equally weighted for example by a factor 1/k. In the alternative it would also be possible to provide a pulse amplitude distribution vector $a=a_1, a_2, \ldots a_m$) (Equation 3) with the property $$\sum_{i=1}^{m} a_i = 1.$$

At this, the element $a_i$ defines the fraction of the amplitude distance Theta ($\theta$) which is cancelled in the signal i for a potential peak at signal index lambda ($\lambda$). In other words, for a potential peak detected at the signal index lambda, the normalized and phase-aligned cancellation pulse for the single-carrier signal with index i is scaled by the factor $a_i \cdot \Theta$ in order to reduce the signal amplitude. The pulse amplitude distribution vector may either be provided directly to the algorithm by the user, or pulse amplitude distribution vector may be determined by some online or offline optimization process. Due to the property of the pulse amplitude distribution vector that its components add up to 1, the value of the absolute value sum at the temporal position lambda ($\lambda$) is reduced to the threshold value theta ($\theta$).

Instead of using the pulse amplitude distribution vector which yields a linear weighting on the cancellation pulses, a more sophisticated non-linear weighting function could also be applied.

An inset within FIG. 5 shows an enlarged view of the effect of a cancellation pulse on single-carrier signal $u^{(2)}$, i.e. the original signal value (unfilled circle) and the signal value after cancellation (solid dot).

Figure 6:
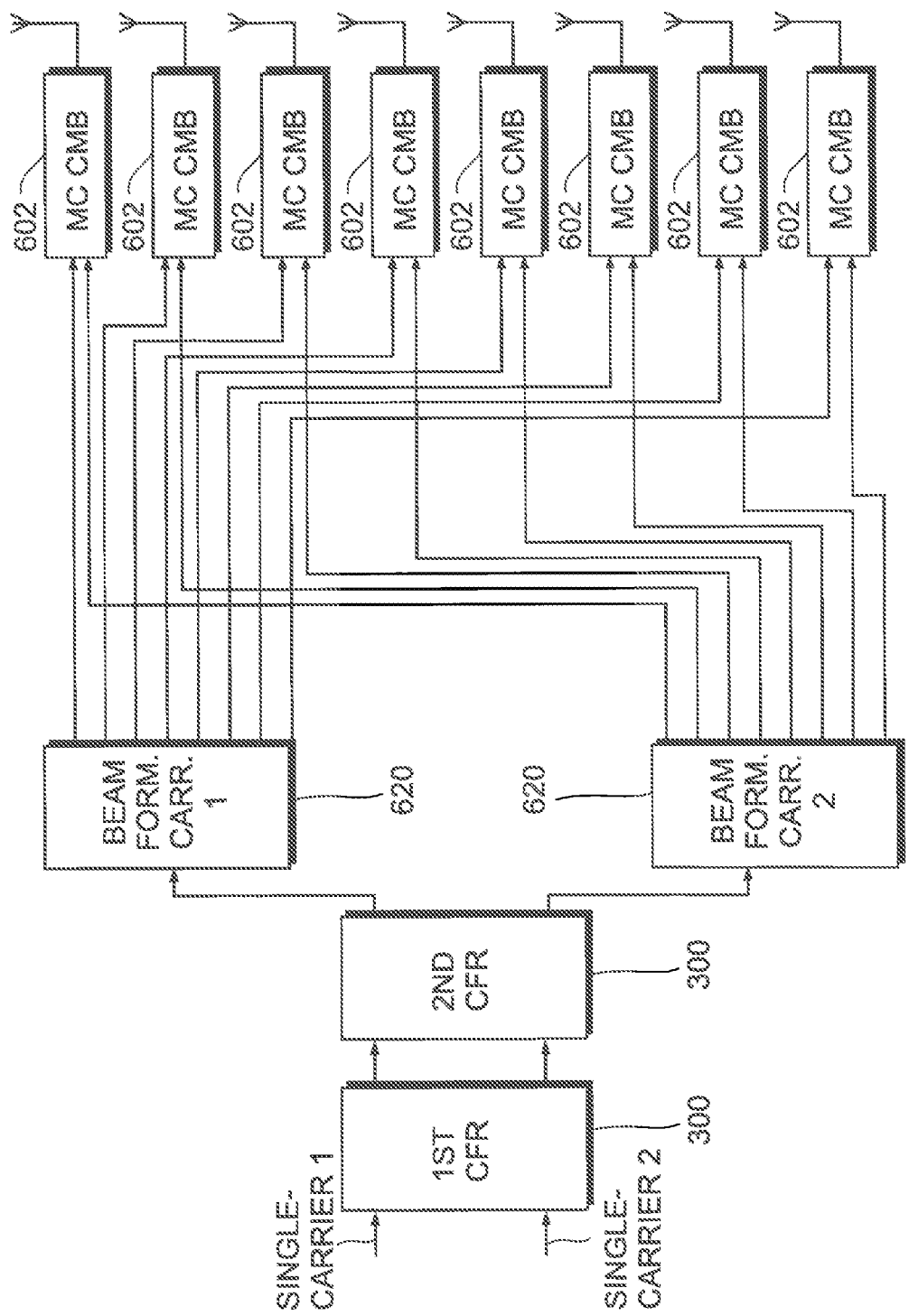
FIG. 6 shows a schematic block diagram of an active antenna array that makes use of the crest factor reduction according to the teachings disclosed herein.

FIG. 6 shows an exemplary use of the crest factor reduction circuit 300 in an active antenna with distributed transceiver architecture. For the sake of clarity of illustration, the multi-carrier signal will be formed by combining two single-carrier signals. The two single-carrier signals are provided to a first crest factor reduction circuit 300 and then to a cascaded second crest factor reduction circuit 300. The first single-carrier signal is then supplied to a beamforming for carrier 1 (reference sign 620) which splits the single-carrier signal into a plurality of single-carrier transmission path signals. According to a beamforming scheme currently implemented by the beamforming for carrier 1 (620), individual phase shifts are applied to the plurality of single-carrier transmission path signals. Each one of the plurality of single-carrier transmission path signals is then sent to one of a plurality of multi-carrier combiners 602. A particular one of the plurality of multi-carrier combiners 602 is part of a particular transmission path which is, in turn, connected to an antenna element. The antenna element is typically part of an array of antenna elements. Not depicted in FIG. 6 are standard components of a transmission path, such as frequency conversion, modulation, amplification, and filtering.

A second single-carrier signal undergoes substantially the same processing as the first single-carrier signal. The beamforming for a second one of the carrier 2 may be different from the beamforming for a first one of the carriers 1. A second plurality of single-carrier transmission path signals is also supplied to the plurality of multi-carrier combiners 602. Taking the upper most multi-carrier combiner 602 as an example, the upper most single-carrier transmission path signal leaving the beamforming for the first carrier 1 (620) is combined with the upper most single-carrier transmission path signal leaving the beamforming for the second carrier 2 (620) to form a transmission path-specific multi-carrier signal which is then radiated by means of the antenna element connected to the upper most multi-carrier combiner 602.

As can be seen on FIG. 6, there is merely one crest factor reduction instance in a base band processing unit which acts on the several single-carrier signals prior to multi-carrier combining. This allows for individual beamforming for each of the carriers, without changing the transceiver hardware. Hence, the technique presented herein enables advanced features like carrier-wise beamforming while, for example, a standard transceiver architecture may be used, because no modification to the hardware needs to be done downstream of the second crest factor reduction circuit 300.

Figure 7:
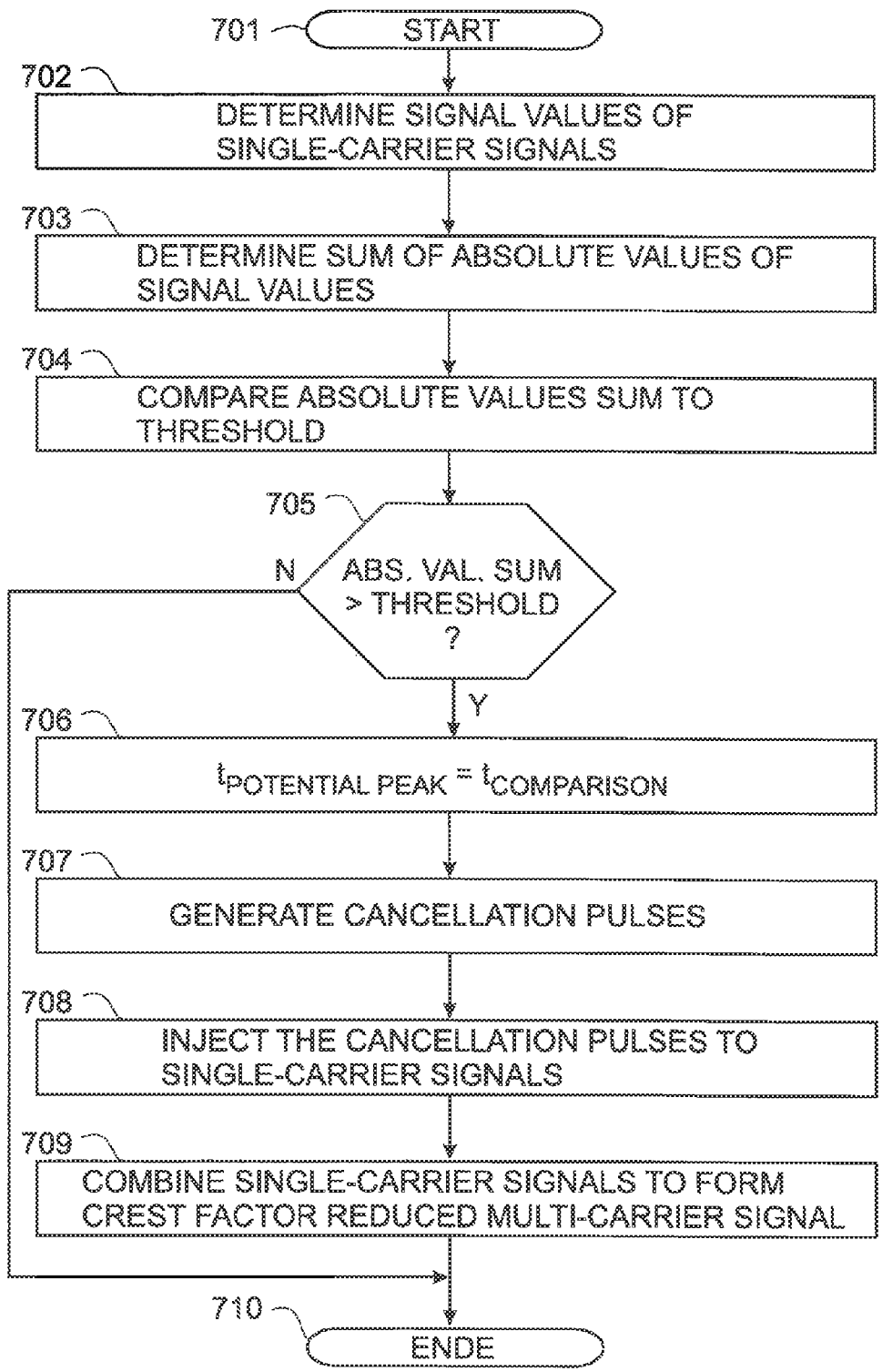
FIG. 7 shows a schematic flow chart of a method for crest factor reduction according to the teachings disclosed herein.

FIG. 7 shows a schematic, exemplary flow chart illustrating one of the aspects of the crest factor reduction method according to the teachings disclosed herein. After the start of the method at 701, the signal values of the plurality of single-carrier signals are determined at 702. The determination of the signal values may be achieved by sampling the plurality of single-carrier signals, in a substantially digital manner. In the alternative, it would also be possible to process the signal values of the single-carrier signals as analog values for the purposes of the crest factor reduction method disclosed herein. Regardless of whether an analog or a digital information is used, the determination of the signal values of the single-carrier signals is usually done in such a manner that those portions of the plurality of single-carrier signals which are likely to be combined during the single-carrier signal combination, are grouped together.

This group of signal values can be analyzed in 703. As an example, the analysis may comprise the determination of the sum of the absolute values of the signal values obtained at 702. The sum of the absolute values of the signal values is an indicator for a potential peak amplitude in a worst case scenario. The worst case scenario would be that all of the single-carrier signals are phase-aligned at a temporal position of a potential peak in the multi-carrier signal. This worst-case scenario is not very likely, but the worst-case scenario can be used, in combination with a suitably chosen threshold, as an indicator for the occurrence of an unacceptably high peak in the multi-carrier signal. At 704 the absolute values sum is compared to the threshold so that at 705 a determination can be made as to whether the absolute values sum is greater than the threshold value or not. The crest factor reduction method proceeds to 710 and terminates if the absolute values sum is not greater than the threshold value. In the contrary case the method continues at 706 in which a temporal position $t_{potential\,peak}$ assumes the value of the temporal position where the comparison was made $t_{comparison}$. At this point, the crest factor reduction method has detected whether a potential peak in the multi-carrier signal has to be expected and, if so, what the temporal position of the potential peak is.

The cancellation pulses are generated at 707 if the potential peak has been detected and the temporal position of the potential peak has been determined. Typically, several ones of the cancellation pulses are generated for each one of the potential peaks. There will be one cancellation pulse per single-carrier signal. The generated cancellation pulses are then injected to the single-carrier signals at 708. The injection 708 of the cancellation pulse to a certain one of the single-carrier signals is done at a temporal injection position that corresponds to the temporal position of the possible peak in the multi-carrier signal. Due to possible differences in the signal processing are among the plurality of signal-carrier signals, in particular with respect to delays and phase shifts, the temporal injection position may be different for two different ones of the single carrier signals. Current settings for the plurality of temporal injection positions may be determined for example on the basis of currently valid beam forming settings, or the settings may be predetermined. In addition, the cancellation pulses can be weighted by means of a pulse amplitude distribution vector before they are injected to the single-carrier signals. This allows the distribution of the cancellation action along the plurality of single-carrier signals in a defined manner, for example placing an emphasis on the cancellation of peak contributions occurring in UMTS signals.

The crest factor reduction method according to the teachings disclosed herein then proceeds to combining the single-carrier signals to form the crest factor reduced multi-carrier signal at 709. Due to the fact that a joint potential peak detection was performed on the plurality of the signal values at the action 703, it can be largely avoided that the single-carrier signals are superposed in an unfavourable manner that could lead to the formation of a peak in the multi-carrier signal. After the single-carrier signals have been combined the crest factor reduction method ends at 710. Typically, the crest factor reduction method will be continuously repeated so that e.g. continuous streams of single-carrier signals may be processed and a continuous stream of the multi-carrier signal may be formed. In a digital implementation of the crest factor reduction method the method may be performed once per signal index, i.e. once per sampling period. It would also be possible that the method acts on a time interval of the single-carrier signals before the method is repeated. Furthermore, combinations of an interval-wise and a sampling-wise execution of crest factor reduction method would be possible.

Figure 8:
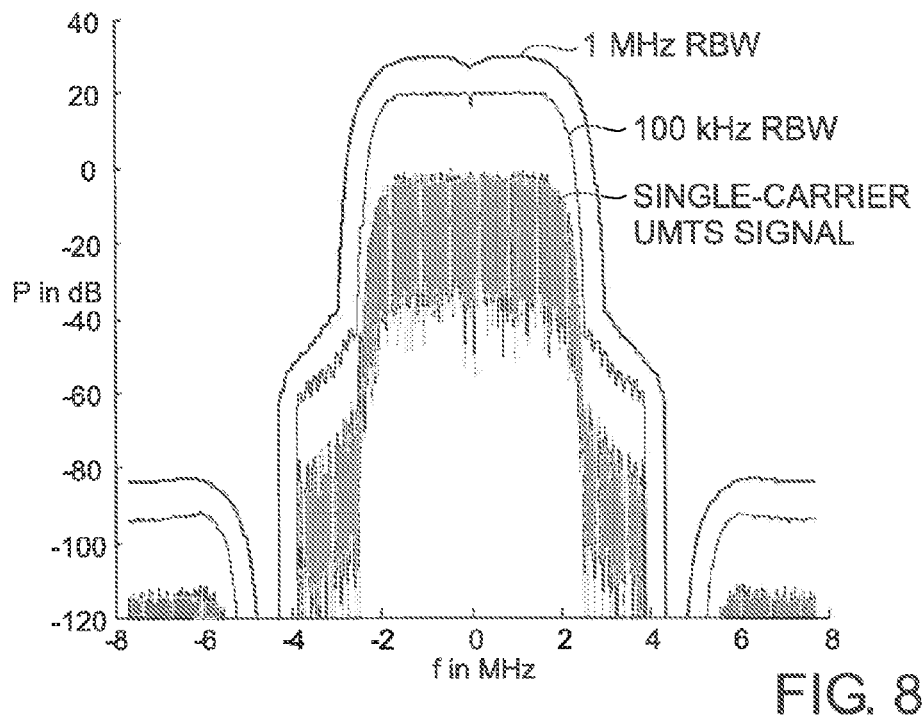
FIG. 8 shows a frequency spectrum of a single-carrier UMTS signal.
Figure 9:
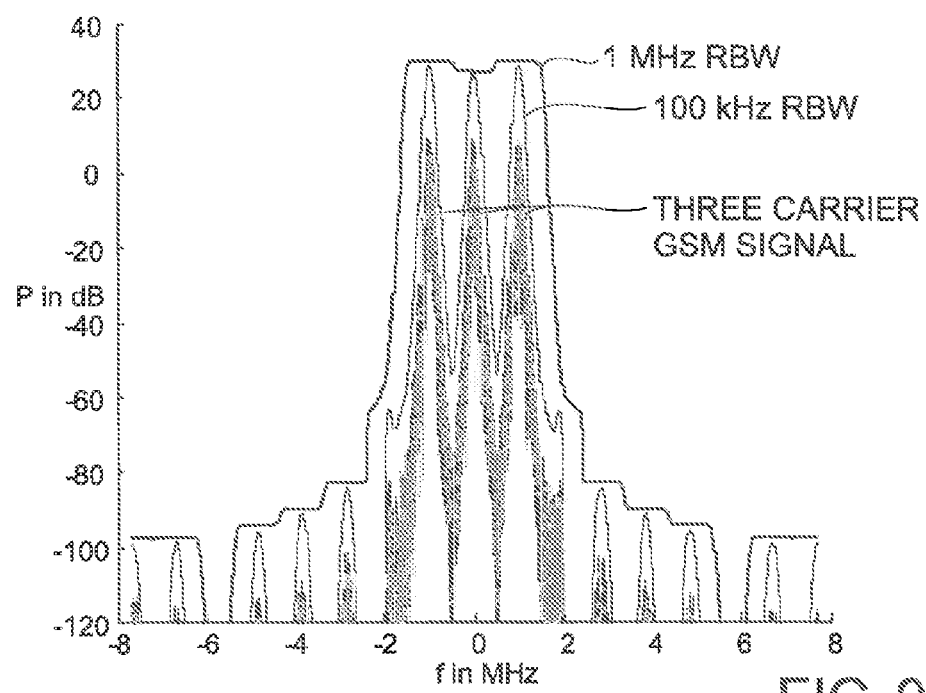
FIG. 9 shows a frequency spectrum of a three-carrier GSM signal.

FIGS. 8 and 9 show the power spectra of different single-carrier signals at the base band. FIG. 8 shows the power spectra of a single-carrier UMTS signal and FIG. 9 shows the power spectra of three GSM signals. The actual power spectrum of the single-carrier UMTS signal is relatively fuzzy and has a bandwidth of approximately 5 MHz. FIG. 8 also shows a 100 kHz resolution bandwidth boundary (100 kHz RBW; thin line) and a 1 MHz resolution bandwidth (1 MHz RBW, thick, upper line). FIG. 9 shows similar curves but for three GSM signals. Each GSM signal has a bandwidth of approximately 1 MHz.

Figure 10:
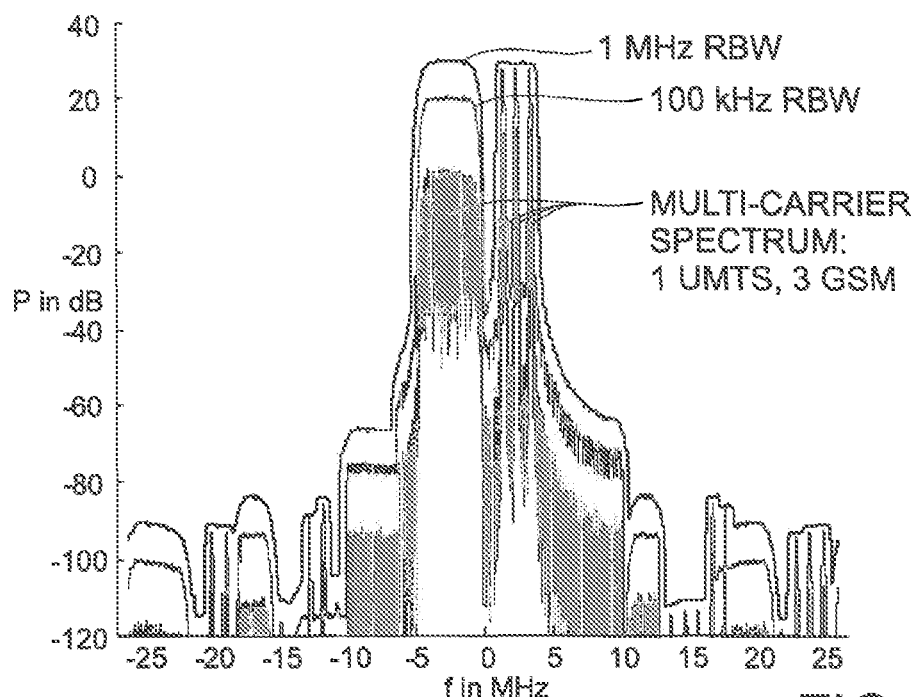
FIG. 10 shows a frequency spectrum of a multi-carrier signal comprising one UMTS signal and three GSM signals.
Figure 11:
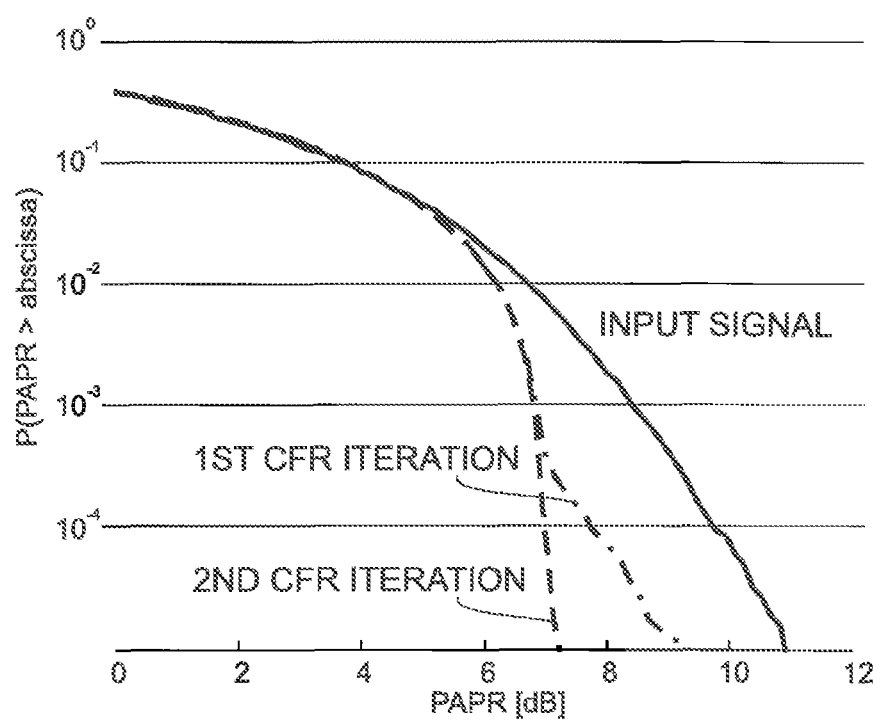
FIG. 11 is a plot of a complementary cumulative distribution function (CCDF) illustrating the performance of the crest factor reduction method according to the teachings disclosed herein.

FIG. 10 shows the power spectrum of a mixed-standard multi-carrier signal which is obtained from one UMTS carrier as depicted in FIG. 8 and a three-carrier GSM signal as depicted in FIG. 9. If these two signals are combined into a multi-carrier signal as illustrated in FIG. 10 without any crest factor reduction, than a crest factor in the order of 10 dB is achieved with a probability of $10^{-4}$. This can be seen in FIG. 11 which is a CCDF (Complementary Cumulative Distribution Function) plot of the peak-to-average power ratio (PAPR). The probability of the peak-to-average power ratio being greater than the value of the abscissa in FIG. 11 for the non-crest factor reduced input signal is shown by the solid line. FIG. 11 also shows a performance of crest factor reduction after a first stage of crest factor reduction (CFR) iteration in a dot-dashed line, and the performance after a second stage of CFR iteration in a dashed line. FIG. 11 shows that after two CFR iterations a crest factor of 7 dB is achieved with a probability of $10^{-4}$. An error vector magnitude (EVM) of the UMTS signal is on the order of 9.5%, and the EVM of the GSM signal is on the order of 4.65%. The crest factor reduction modifies the signal and this causes an increase in the error vector magnitude. Nevertheless, the EVM values are acceptable and within the specifications of the UMTS and GSM standards.

Figure 12:
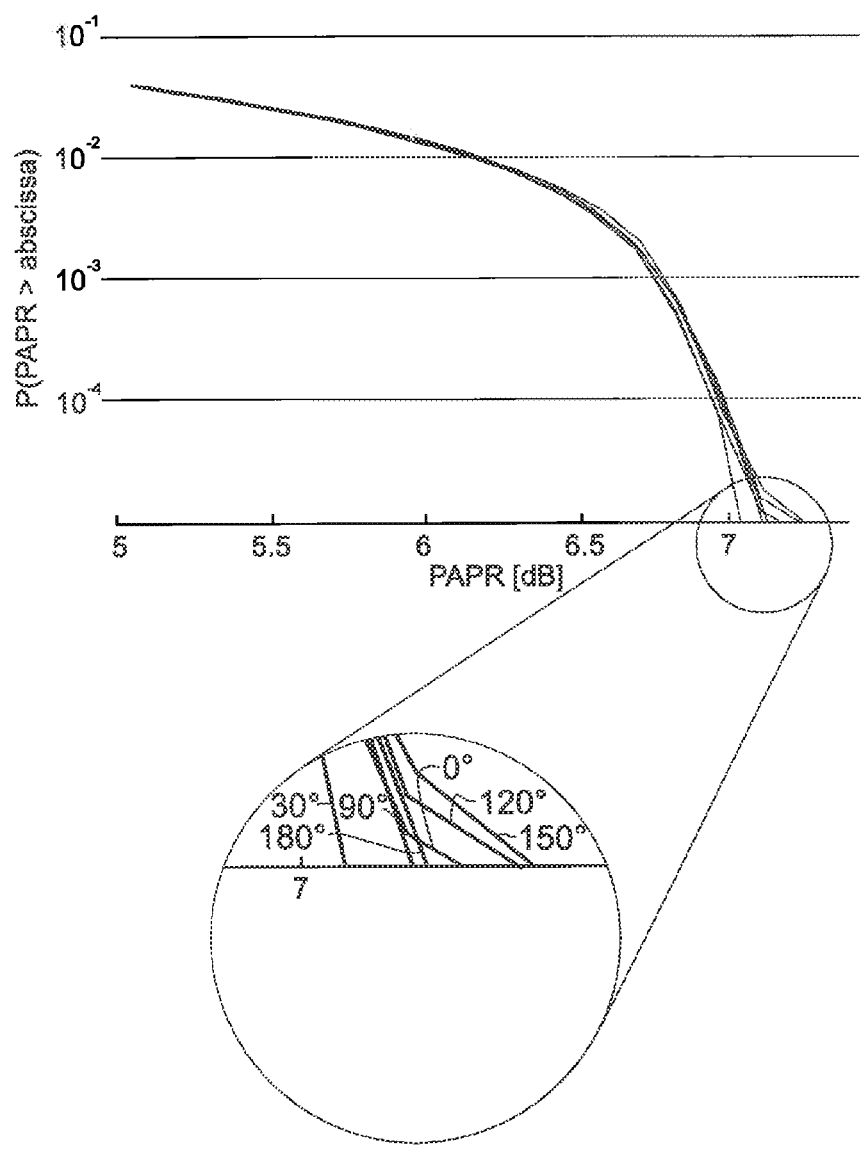
FIG. 12 is a complementary cumulative distribution function plot of signals that have undergone crest factor reduction according to the teachings disclosed herein, wherein the signals are multi-carrier signals with different relative phases between their respective semi-carrier signals.

FIG. 12 shows how the crest factor reduction according to the teachings disclosed herein reacts to variations in the phase and the frequencies of the UMTS signal and the GSM signal when they are combined into a multi-carrier signal. For the purposes of creating the graph in FIG. 12 two single-carrier signals were created and a relative phase was introduced between these two single-carrier signals. The probability of the PAPR>abscissa was plotted for relative phases of 0°, 30°, 90°, 120°, 150° and 180°. Note that regardless of the relative phase a peak-to-average power ratio of 7 dB is achieved with a probability of $10^{-4}$. For a practical application this result means that a single-carrier signal may be phase shifted within large ranges downstream of the crest factor reduction without a risk of the crest factor increasing again.

While various embodiments of the present invention have been described above, it should be understood that they have been presented by way of examples, and not limitation. It will be apparent to persons skilled in the relevant art that various changes in form and detail can be made therein without departing from the scope of the invention. In addition to using hardware (e.g. within or coupled to a central processing unit (CPU), microprocessor, microcontroller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer useable (e.g. readable) medium configured to store the software. Such software can enable, for example, the function, fabrication, modelling, simulation, description and/or testing of the circuits and methods described herein. For example, this can be accomplished through the use of general program languages (e.g. C, C++), hardware description languages (HDL) including Verilog, HDL, VHDL, etc., or other available programs. Such software can be disposed in any known non-transitory computer useable medium such as semiconductor, magnetic disk, or optical disk (e.g. CD-ROM, DVD-ROM, etc.) The software can also be disposed as computer data embodied in a non-transitory computer useable (e.g. readable) transmission medium (e.g. solid state memory and other non-transitory medium including digital, optical, analogue base medium such as removable storage media). Embodiments of the present invention may include methods of providing the circuit described herein by providing software describing the apparatus and subsequently transmitting the software as a computer data signal over a communication network including the internet and intranet.

It is understood that the circuit and method described herein may be included in a semiconductor intellectual property core, such as a microprocessor core (e.g. embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A method for crest factor reduction of a multi-carrier signal comprising a plurality of single-carrier signals, the method comprising:
sampling to detect time segments of the plurality of single-carrier signals prior to combining the plurality of single-carrier signals to form the multi-carrier signal, the sampling producing a plurality of sampled single-carrier signals;
performing a joint potential peak detection on the plurality of sampled single-carrier signals and thus producing a temporal position of a possible peak in the multi-carrier signal, whereby the joint potential peak detection is carried out by determining a sum of absolute values of the plurality of single-carrier signals at a comparison temporal position to derive an absolute values sum, comparing the absolute values sum to a peak indicator threshold, and adopting the comparison temporal position as the temporal position of the possible peak in the multi-carrier signal, if the absolute values sum is greater than the peak indicator threshold;
generating a plurality of cancellation pulses;
injecting the plurality of cancellation pulses to the plurality of single-carrier signals at a plurality of temporal injection positions, the plurality of temporal injection positions corresponding to the temporal position of the possible peak in the multi-carrier signal; and
combining the single-carrier signals to form a crest factor reduced multi-carrier signal,
wherein the joint potential peak detection further comprises:
finding an interval in which the absolute values sum is greater than the peak indicator threshold;
determining values of the multi-carrier signal within the interval; and
determining a maximum of the values of the multi-carrier signal and a maximum position of the maximum, and adopting the maximum position as the temporal position of the possible peak in the multi-carrier signal.

2. The method of claim 1, wherein ones of the plurality of cancellation pulses have spectral properties that substantially match single-carrier spectral properties of corresponding ones the plurality of single-carrier signals.

3. The method of claim 1, wherein phases of ones of the plurality of cancellation pulses injected to corresponding ones of the plurality of single-carrier signals are substantially aligned to phases of the corresponding ones of the plurality of single-carrier signals so that ones of the plurality of cancellation pulses and corresponding ones of a plurality of single-carrier signal contributions to the possible peak in the multi-carrier signal are subject to an at least partial destructive interference.

4. The method of claim 1, further comprising:
weighting the plurality of cancellation pulses with a pulse amplitude distribution vector prior to injecting the plurality of cancellation pulses to the plurality of single-carrier signals.

5. A crest factor reduction circuit for multi-carrier signal formed by combining a plurality of single-carrier signals, the crest factor reduction circuit being placeable upstream of a combining point of the plurality of single-carrier signals and comprising:
a sampler configured to sample the plurality of single-carrier signals and to produce a plurality of sampled single-carrier signals;
a joint peak detector configured to analyze the plurality of single-carrier signals and to produce a temporal position of a possible peak in the multi-carrier signal;
a plurality of cancellation pulse generators; and
a plurality of cancellation pulse injectors configured to inject the plurality of cancellation pulses to the plurality of single-carrier signals at a plurality of temporal injection positions, the plurality of temporal injection positions corresponding to the temporal position of the possible peak in the multi-carrier signal,
wherein the joint potential peak detector comprises:
an adder configured to add the absolute values of the plurality of single-carrier signals at a comparison temporal position to form an absolute values sum; and
a comparator configured to compare the absolute values sum with a peak indicator threshold; and
wherein the plurality of cancellation pulse injectors are adapted to inject the plurality of cancellation pulses at the comparison temporal threshold if the comparator has detected that the absolute values sum is greater than the peak indicator threshold,
an interval finder configured to find an interval in which the absolute values sum is greater than the peak indicator threshold;
a multi-carrier signal evaluator configured to determine values of the multi-carrier signal within the signal; and
a maximum finder configured to determine a maximum of the values of the multi-carrier signal and a maximum position of the maximum, and to adopt the maximum position as the temporal position of the possible peak in the multi-carrier signal.

6. The crest factor reduction circuit of claim 5, wherein the plurality of cancellation pulse generators are adapted to generate cancellation pulses having spectral properties that substantially match single-carrier spectral properties of corresponding ones of the plurality of single-carrier signals.

7. The crest factor reduction circuit of claim 5, wherein the plurality of cancellation pulse injectors are adapted to substantially align phases of ones of the plurality if cancellation pulses to corresponding ones of the plurality of single-carrier signals so that ones of the plurality of cancellation pulses and corresponding ones of a plurality of single-carrier signal contributions to the possible peak in the multi-carrier signal are subject to an at least partial destructive interference.

8. The crest factor reduction circuit of claim 5, further comprising a cancellation pulse weighting unit configured to weight the plurality of cancellation pulses with a pulse amplitude distribution vector upstream of the combining point.

9. A mobile communications transmitter comprising a crest factor reduction circuit for multi-carrier signal formed by combining a plurality of single-carrier signals, the crest factor reduction circuit being placeable upstream of a combining point of the plurality of single-carrier signals, the crest factor reduction circuit comprising:
a sampler configured to sample the plurality of single-carrier signals and to produce a plurality of sampled single-carrier signals;
a joint peak detector configured to analyze the plurality of single-carrier signals and to produce a temporal position of a possible peak in the multi-carrier signal; wherein the joint potential peak detector comprises: an adder configured to add the absolute values of the plurality of single-carrier signals at a comparison temporal position to form an absolute values sum; and a comparator configured to compare the absolute values sum with a peak indicator threshold;
a plurality of cancellation pulse generators; and
a plurality of cancellation pulse injectors configured to inject the plurality of cancellation pulses to the plurality of single-carrier signals at a plurality of temporal injection positions, the plurality of temporal injection positions corresponding to the temporal position of the possible peak in the multi-carrier signal, an interval finder configured to find an interval in which the absolute values sum is greater than the peak indicator threshold;

a multi-carrier signal evaluator configured to determine values of the multi-carrier signal within the signal; and a maximum finder configured to determine a maximum of the values of the multi-carrier signal and a maximum position of the maximum, and to adopt the maximum position as the temporal position of the possible peak in the multi-carrier signal, wherein the plurality of cancellation pulse injectors are adapted to inject the plurality of cancellation pulses at the comparison temporal threshold if the comparator has detected that the absolute values sum is greater than the peak indicator threshold.

10. A mobile communications base station comprising a crest factor reduction circuit for multi-carrier signal formed by combining a plurality of single-carrier signals, the crest factor reduction circuit being placeable upstream of a combining point of the plurality of single-carrier signals, the crest factor reduction circuit comprising:

a sampler configured to sample the plurality of single-carrier signals and to produce a plurality of sampled single-carrier signals;

a joint peak detector configured to analyze the plurality of single-carrier signals and to produce a temporal position of a possible peak in the multi-carrier signal;

a plurality of cancellation pulse generators; and a plurality of cancellation pulse injectors configured to inject the plurality of cancellation pulses to the plurality of single-carrier signals at a plurality of temporal injection positions, the plurality of temporal injection positions corresponding to the temporal position of the possible peak in the multi-carrier signal, wherein the joint potential peak detector comprises:

an adder configured to add the absolute values of the plurality of single-carrier signals at a comparison temporal position to form an absolute values sum; and a comparator configured to compare the absolute values sum with a peak indicator threshold;

an interval finder configured to find an interval in which the absolute values sum is greater than the peak indicator threshold;

a multi-carrier signal evaluator configured to determine values of the multi-carrier signal within the signal; and a maximum finder configured to determine a maximum of the values of the multi-carrier signal and a maximum position of the maximum, and to adopt the maximum position as the temporal position of the possible peak in the multi-carrier signal; wherein the plurality of cancellation pulse injectors are adapted to inject the plurality of cancellation pulses at the comparison temporal threshold if the comparator has detected that the absolute values sum is greater than the peak indicator threshold.

11. A computer program product comprising a non-transitory computer-usable medium having control logic stored therein for causing processor to execute a method for crest factor reduction of a multi-carrier signal comprising a plurality of single-carrier signals, the method comprising:

detecting time segments of the plurality of single-carrier signals prior to combining the plurality of single-carrier signals to form the multi-carrier signal, the sampling producing a plurality of sampled single-carrier signals;

performing a joint potential peak detection on the plurality of sampled single-carrier signals to produce a temporal position of a possible peak in the multi-carrier signal, the joint potential peak detection being performed by determining a sum of absolute values of the plurality of single-carrier signals at a comparison temporal position to produce an absolute values sum, comparing the absolute values sum to a peak indicator threshold, and adopting the comparison temporal position as the temporal position of the possible peak in the multi-carrier signal if the absolute values sum is greater than the peak indicator threshold;

generating a plurality of cancellation pulses;

injecting the plurality of cancellation pulses to the plurality of single-carrier signals at a plurality of temporal injection positions, the plurality of temporal injection positions corresponding to the temporal position of the possible peak in the multi-carrier signal;

combining the single-carrier signals to form a crest factor reduced multi-carrier signal, wherein the joint potential peak detection comprises:

determining a sum of absolute values of the plurality of single-carrier signals at a comparison temporal position, this sum being termed the "absolute values sum";

comparing the absolute values sum to a peak indicator threshold; and adopting the comparison temporal position as the temporal position of the possible peak in the multi-carrier signal if the absolute values sum is greater than the peak indicator threshold, wherein the joint potential peak detection further comprises:

finding an interval in which the absolute values sum is greater than the peak indicator threshold;

determining values of the multi-carrier signal within the interval; and determining a maximum of the values of the multi-carrier signal and a maximum position of the maximum, and adopting the maximum position as the temporal position of the possible peak in the multi-carrier signal.

12. A computer program product comprising a non-transitory computer-usable medium having control logic stored therein for causing a computer to manufacture a crest factor reduction circuit comprising:

a sampler configured to detect time segments of the plurality of single-carrier signals and to produce a plurality of sampled single-carrier signals;

a joint peak detector configured to analyze the plurality of single-carrier signals and to produce a temporal position of a possible peak in the multi-carrier signal;

a plurality of cancellation pulse generators; and a plurality of cancellation pulse injectors configured to inject the plurality of cancellation pulses to the plurality of single-carrier signals at a plurality of temporal injection positions, the plurality of temporal injection positions corresponding to the temporal position of the possible peak in the multi-carrier signal;

wherein the joint potential peak detector comprises:

an adder configured to add the absolute values of the plurality of single-carrier signals at a comparison temporal position to form an absolute values sum;

a comparator configured to compare the absolute values sum with a peak indicator threshold;

wherein the plurality of cancellation pulse injectors are adapted to inject the plurality of cancellation pulses at the comparison temporal threshold if the comparator has detected that the absolute values sum is greater than the peak indicator threshold;

an interval finder configured to find an interval in which the absolute values sum is greater than the peak indicator threshold;

a multi-carrier signal evaluator configured to determine values of the multi-carrier signal within the signal; and a maximum finder configured to determine a maximum of the values of the multi-carrier signal and a maximum position of the maximum, and to adopt the maximum position as the temporal position of the possible peak in the multi-carrier signal.

* * * * *

UNITED STATES PATENT AND TRADEMARK OFFICE
CERTIFICATE OF CORRECTION

PATENT NO. : 8,599,961 B2
APPLICATION NO. : 12/904538
DATED : December 3, 2013
INVENTOR(S) : Georg Schmidt et al.

It is certified that error appears in the above-identified patent and that said Letters Patent is hereby corrected as shown below:

In the Specification

Column 14, line 3 should read:

$$\left\{ \mathbf{v} \mid_{l_1}^{l_2} = (v_{l_1}, \ldots, v_{l_2}) : \left| u_l^{(1)} \right| + \ldots + \left| u_l^{(m)} \right| > \theta \ \forall l_1 \leq l \leq l_2, \text{ and } \left| u_l^{(1)} \right| + \ldots + \left| u_l^{(m)} \right| \leq \theta \text{ for } l \in \{l_1 - 1, l_2 - 1\} \right\}$$

Equation 1

Column 15, line 16 should read:

vector a = ($a_1$, $a_2$, … $a_m$) (Equation 3)

Signed and Sealed this
Eighth Day of April, 2014

Michelle K. Lee
*Deputy Director of the United States Patent and Trademark Office*